(12) United States Patent
Nakagai et al.

(10) Patent No.: US 9,323,129 B2
(45) Date of Patent: Apr. 26, 2016

(54) SHUTTER DRIVE DEVICE

(71) Applicant: Panasonic Intellectual Property Management Co., Ltd., Osaka (JP)

(72) Inventors: Yasuhiro Nakagai, Osaka (JP); Hiroki Aono, Osaka (JP); Yoshihiro Nakajima, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/557,620

(22) Filed: Dec. 2, 2014

(65) Prior Publication Data

US 2015/0168805 A1  Jun. 18, 2015

(30) Foreign Application Priority Data

Dec. 18, 2013 (JP) ................................. 2013-260922
Nov. 21, 2014 (JP) ................................. 2014-236096

(51) Int. Cl.
*G03B 7/22* (2006.01)

(52) U.S. Cl.
CPC ........................................ *G03B 7/22* (2013.01)

(58) Field of Classification Search
CPC ....... G03B 9/58; G03B 7/22; Y10T 74/19874
See application file for complete search history.

(56) References Cited

U.S. PATENT DOCUMENTS

| 3,847,322 | A  | * | 11/1974 | Smith | ........................... 227/132 |
| 6,812,965 | B1 | * | 11/2004 | Kijima et al. | ................. 348/312 |
| 2012/0249861 | A1 | * | 10/2012 | Takahata et al. | ............. 348/362 |
| 2012/0251094 | A1 |   | 10/2012 | Wakikawa et al. |   |

FOREIGN PATENT DOCUMENTS

JP  2012-215797 A  11/2012

* cited by examiner

*Primary Examiner* — Clayton E Laballe
*Assistant Examiner* — Noam Reisner
(74) *Attorney, Agent, or Firm* — Renner, Otto, Boisselle & Sklar, LLP

(57) ABSTRACT

An object of the present disclosure is to increase a frame speed at the time of performing continuous shooting in a shutter drive device by controlling a charge member by using a position sensor and a temperature sensor. The shutter drive device of the present disclosure includes: a shutter mechanism; a charging member that drives the shutter mechanism by using a plurality of gears, a rack member, and a motor; the temperature sensor mounted on the charging member; a position sensor that is mounted on the charging member, and detects the rack member moved to a predetermined position; and a control part that controls stop timing of the motor based on a position of the rack member detected by the position sensor and a temperature detected by the temperature sensor.

5 Claims, 10 Drawing Sheets

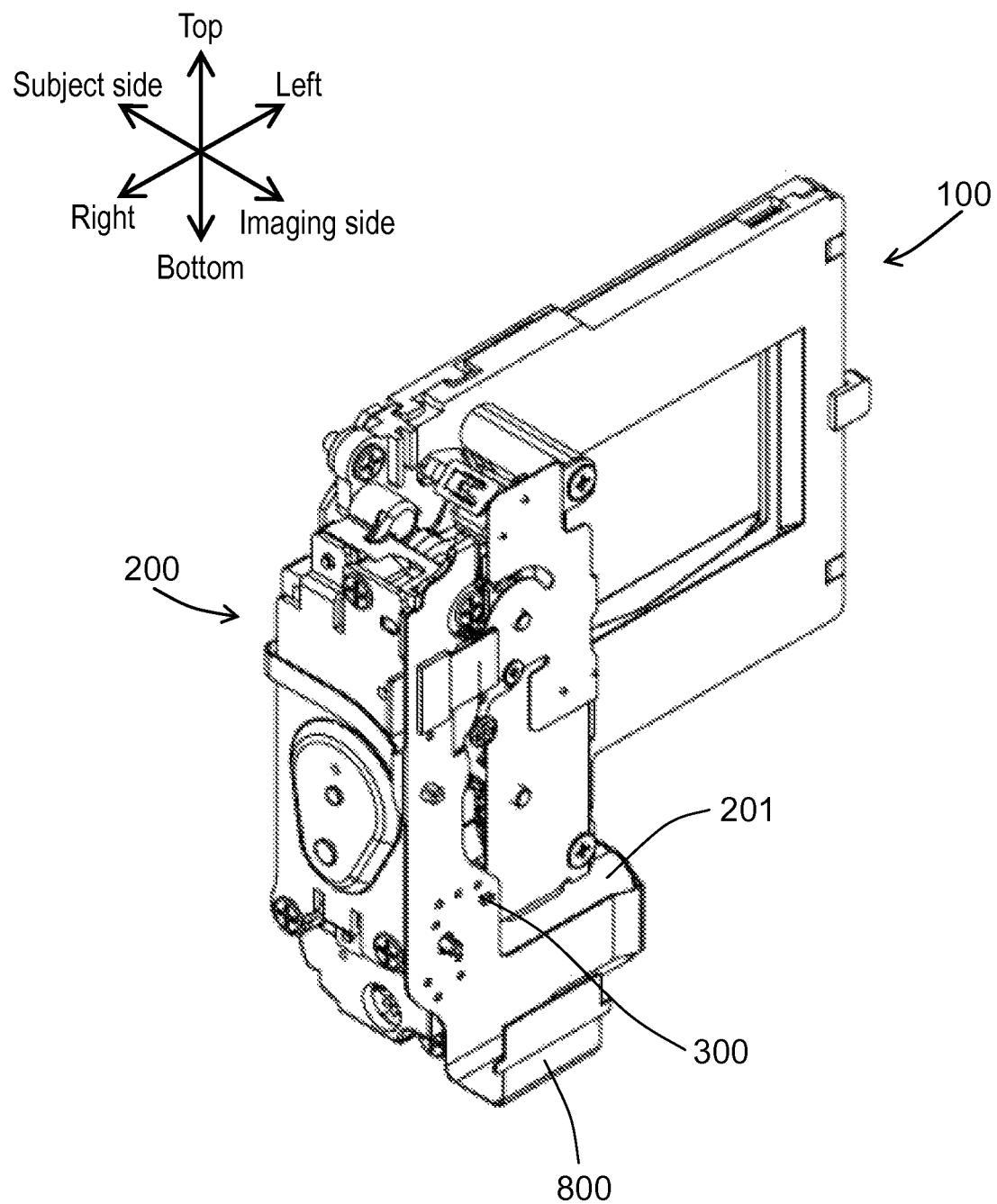

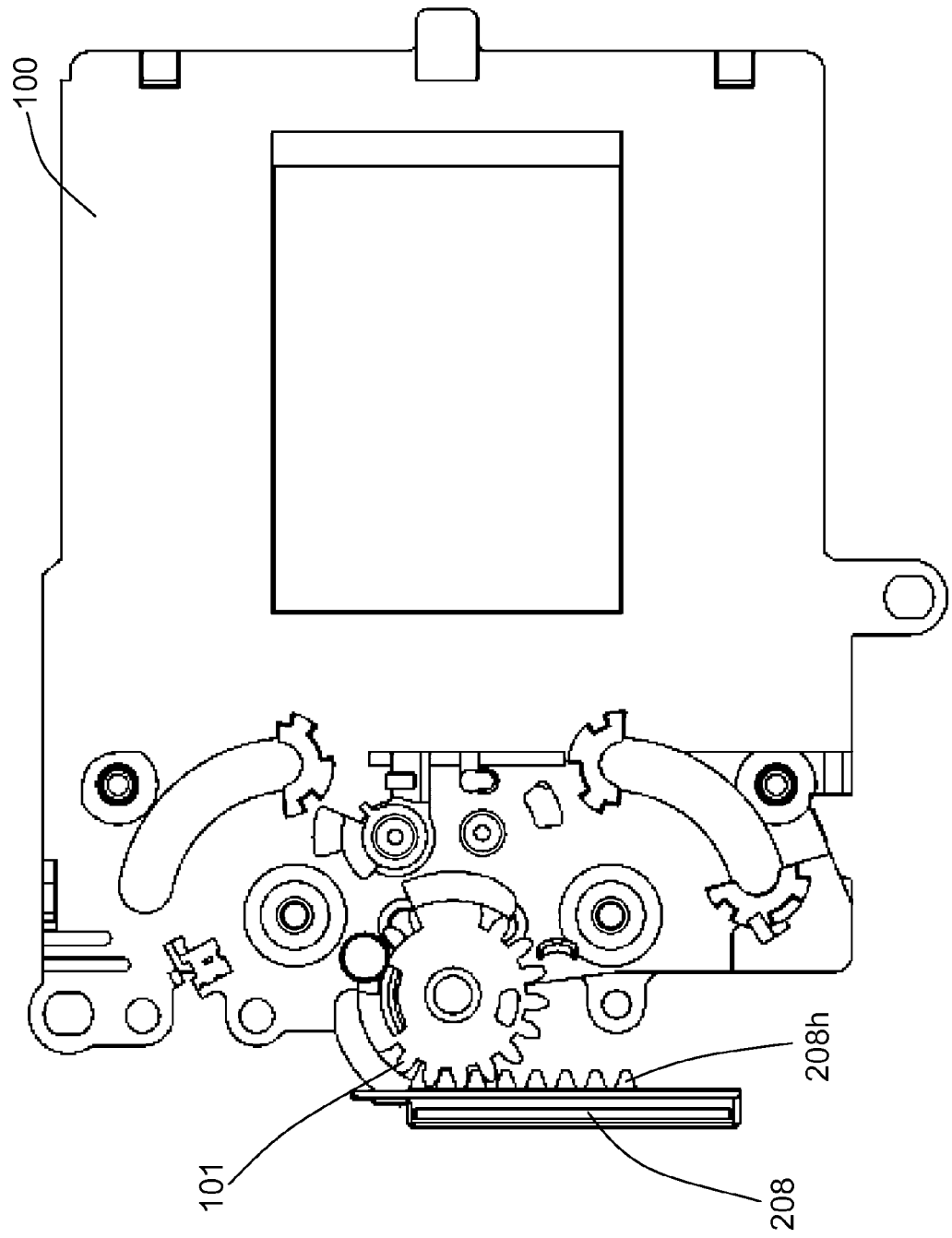

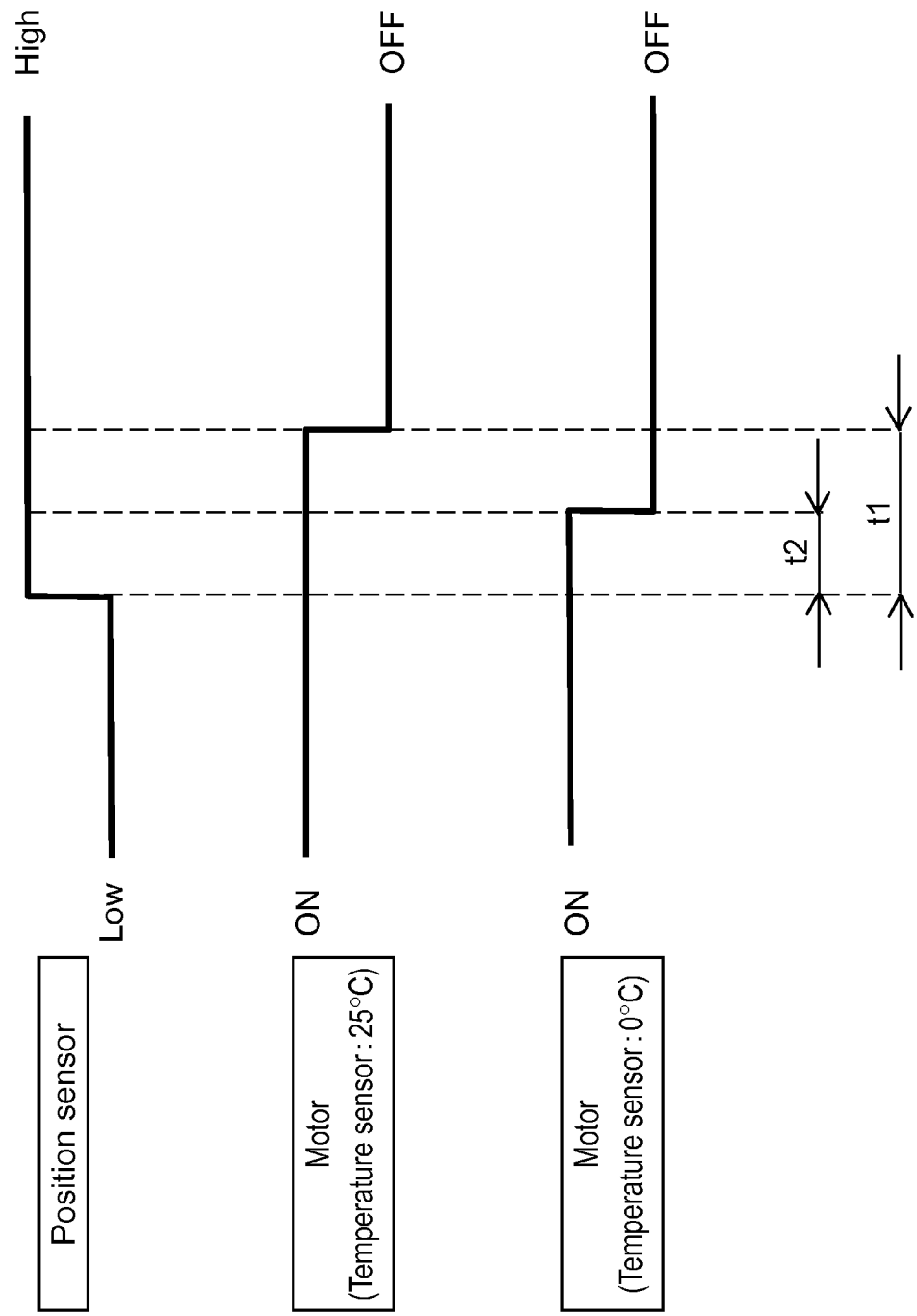

SHUTTER DRIVE DEVICE

BACKGROUND

1. Technical Field

The present disclosure relates to a shutter drive device having a mechanical shutter, and more particularly to a shutter drive device used for an imaging device and the like.

2. Description of the Related Art

Unexamined Japanese Patent Publication No. 2012-215797 (PTL 1) discloses a shutter drive device. PTL 1 discloses a configuration where an intermittent cam follower is made to engage with a slide lever. Due to such a configuration, the shutter drive device can be miniaturized.

CITATION LIST

Patent Literature

PTL 1: Unexamined Japanese Patent Publication No. 2012-215797

SUMMARY

It is an object of the present disclosure to increase a frame speed at the time of performing continuous shooting in a shutter drive device.

According to one aspect of the present disclosure, there is provided a shutter drive device including: a shutter mechanism; a charging member that drives the shutter mechanism by using a plurality of gears, a rack member, and a motor; a temperature sensor mounted on the charging member; a position sensor that is mounted on the charging member, and detects the rack member moved to a predetermined position; and a control part that controls stop timing of the motor based on a position of the rack member detected by the position sensor and a temperature detected by the temperature sensor.

According to another aspect of the present disclosure, there is provided a shutter drive device including: a shutter mechanism; a charging member that drives the shutter mechanism by using a plurality of gears, a rack member, and a motor; a temperature sensor mounted on the charging member; and a control part that controls stop timing of the motor based on a temperature detected by the temperature sensor.

In the shutter drive device of the present disclosure, the charge member is controlled based on a temperature detected by a temperature sensor and hence, the shutter drive device of the present disclosure is effective to increase a frame speed at the time of performing continuous shooting, for example.

BRIEF DESCRIPTION OF DRAWINGS

FIG. 2 is a perspective view of a shutter drive device according to the first embodiment;

FIG. 5 is a back view showing the internal configuration of the shutter drive device according to the first embodiment;

FIG. 7 is a timing chart of controlling the position sensor and a charging motor according to the first embodiment.

DETAILED DESCRIPTION OF THE PREFERRED EMBODIMENTS

Hereinafter, embodiments are described in detail with reference to the drawings appropriately. However, descriptions in detail more than necessary may be omitted. For example, matters which have been already well known may not be described in detail, and substantially the same configurations may not be described redundantly. This is for avoiding the following descriptions from being unnecessarily redundant and for allowing those skilled in the art to easily understand them.

The inventors of the present disclosure provide the accompanying drawings and the following description for allowing those skilled in the art to sufficiently understand the present disclosure, and the subject defined in the claims is not intended to be restricted thereby.

First Embodiment

1-1. Configuration of Digital Camera

Figure 1:
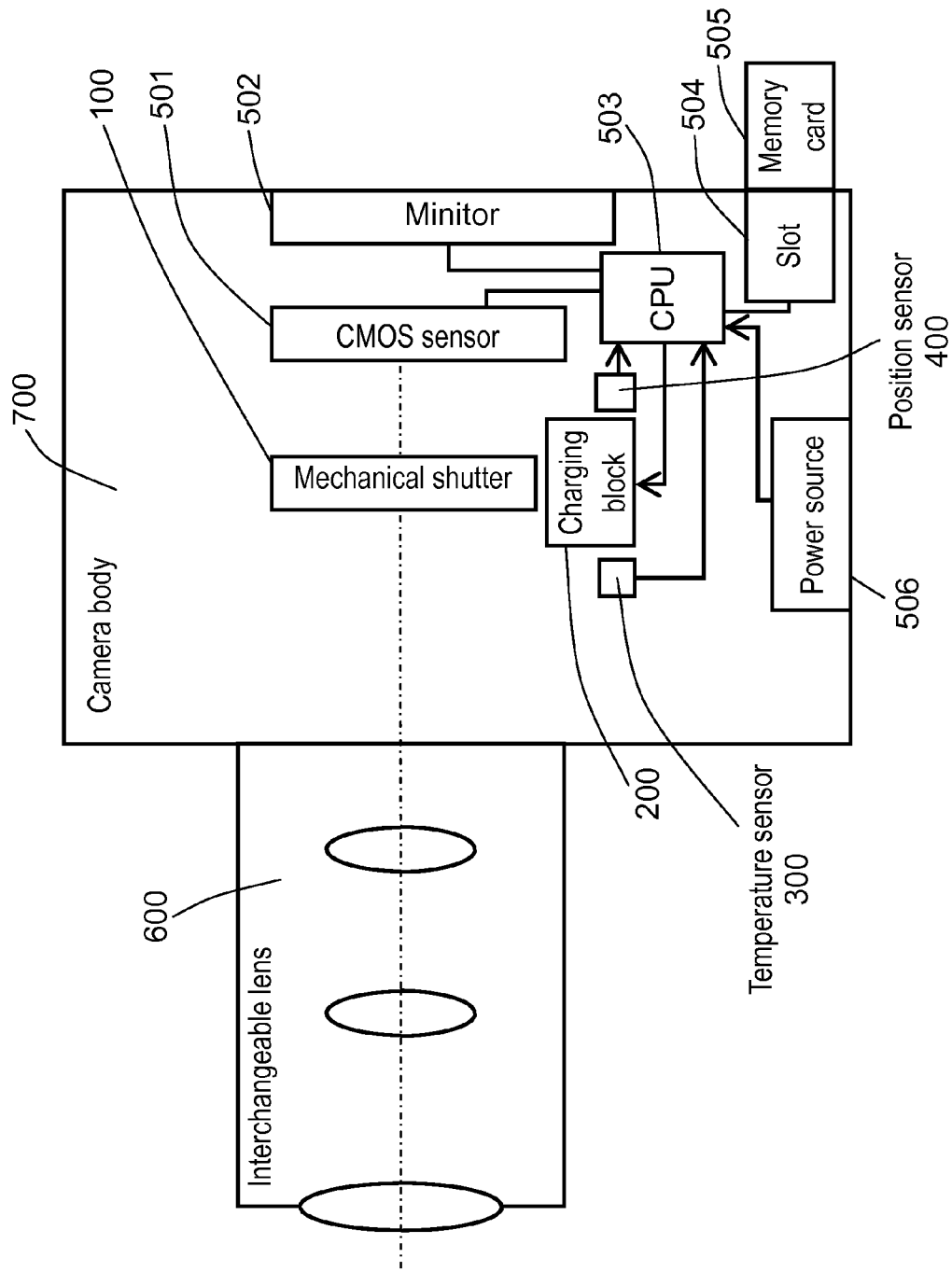
FIG. 1 is a configuration diagram of a digital camera according to a first embodiment.

FIG. 1 is a configuration diagram of the digital camera. The digital camera includes interchangeable lens 600 and camera body 700. Camera body 700 includes mechanical shutter 100, charging block 200, CMOS sensor 501, monitor 502, CPU 503, slot 504 in which memory card 505 is installed, and power source 506. CPU 503 is one example of a control part.

Temperature sensor 300 and position sensor 400 are disposed in the vicinity of charging block 200.

CPU 503 is electrically connected to temperature sensor 300, position sensor 400, and charging block 200.

1-2. Configuration of Shutter Drive Device

FIG. 2 is a perspective view of the shutter drive device. The shutter drive device includes mechanical shutter 100 and charging block 200.

Mechanical shutter 100 is a general focal-plane shutter having a front curtain and a rear curtain. Although not shown in the drawing, mechanical shutter 100 includes a base member having an opening, the front curtain, the rear curtain, a front curtain spring which biases the front curtain in an open state, a rear curtain spring which biases the rear curtain in a closed state, and the like.

Charging block 200 includes charging motor 201. Charging motor 201 is connected to CPU 503 via flexible cable 800.

Temperature sensor 300 and position sensor 400 are disposed on flexible cable 800. Temperature sensor 300 can be formed of an IC, for example.

Figure 3A:
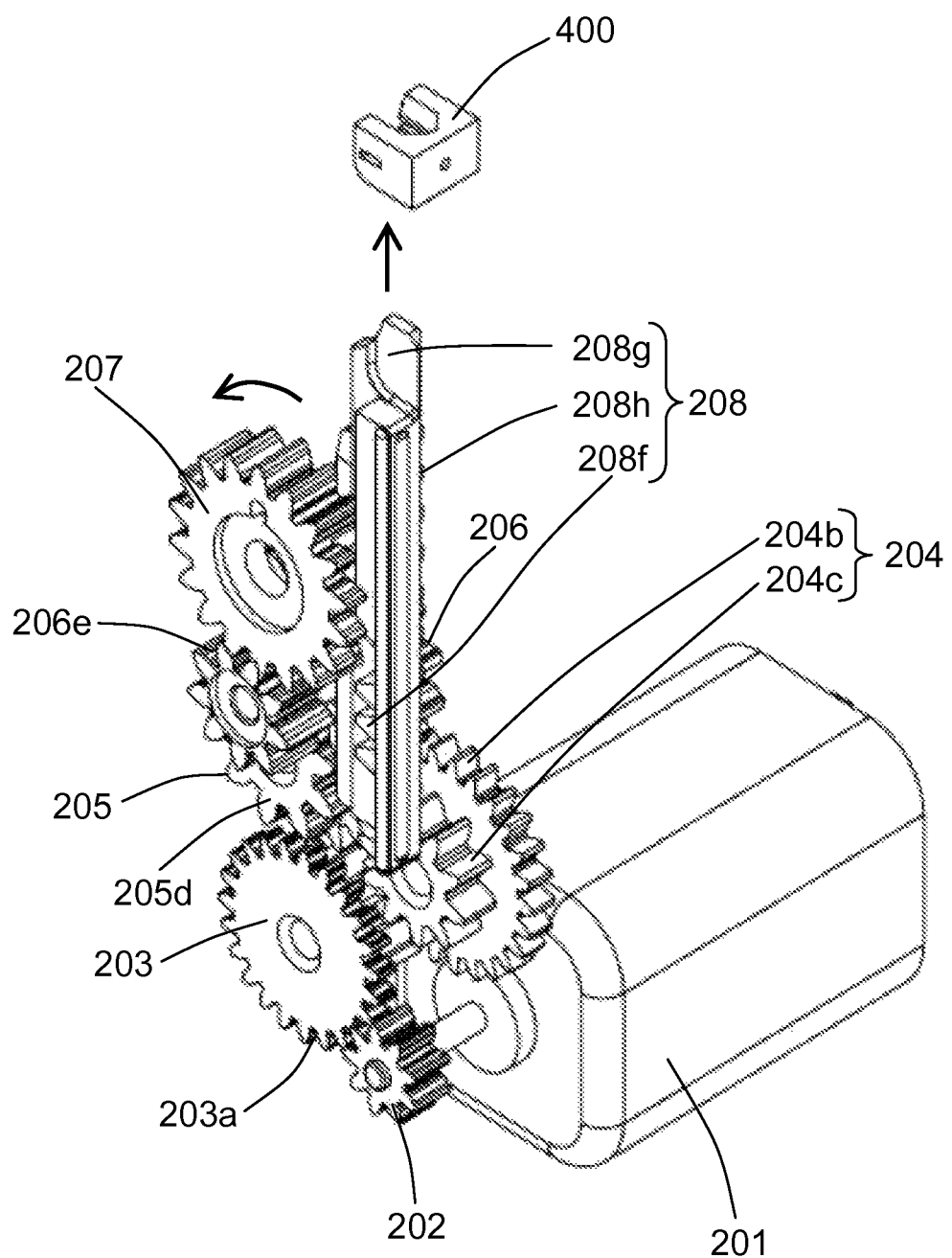
FIG. 3A is a right upper perspective view showing the internal configuration of a charging block according to the first embodiment.
Figure 3B:
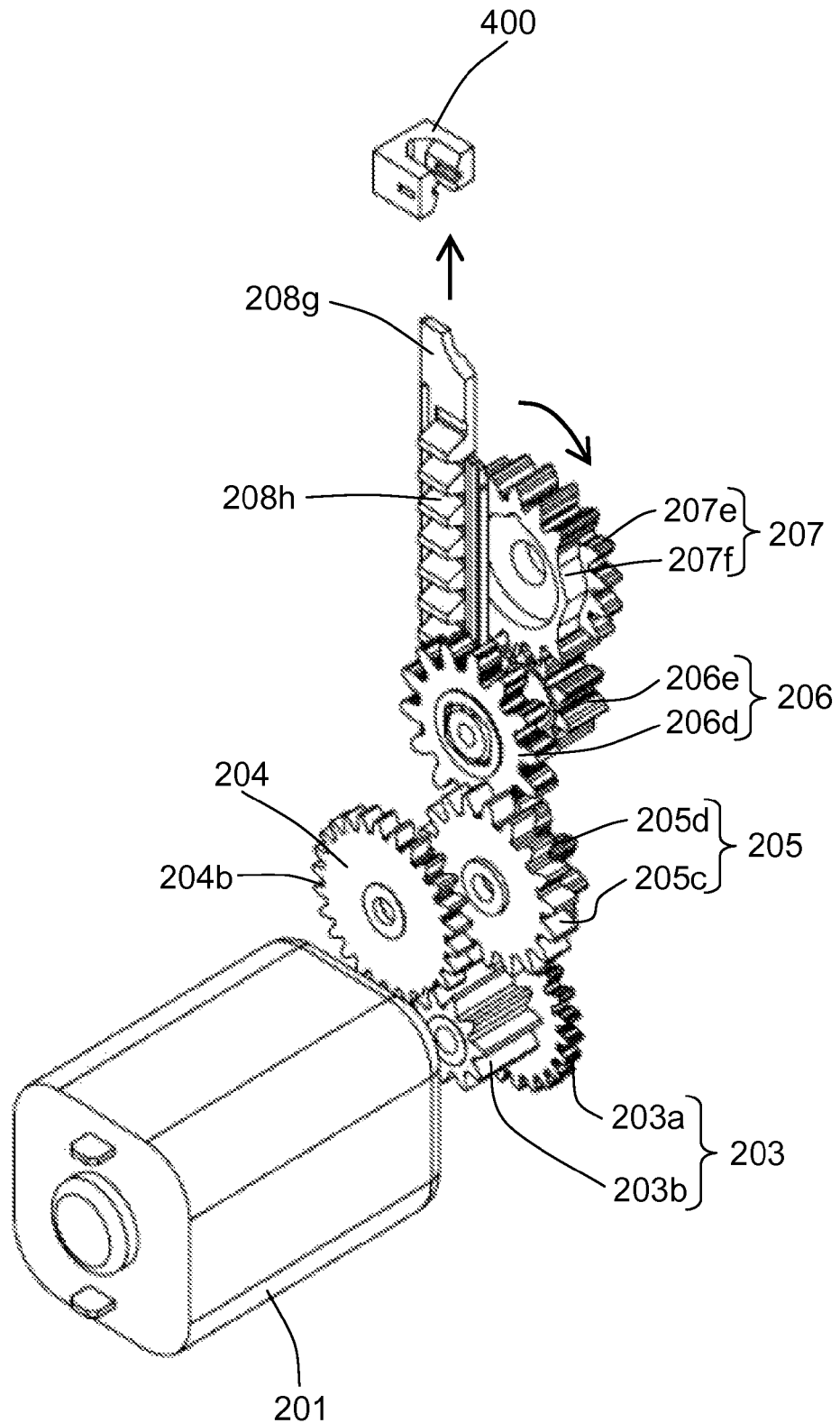
FIG. 3B is a left upper perspective view showing the internal configuration of the charging block according to the first embodiment.

FIG. 3A is a right upper perspective view showing the internal configuration of charging block 200. FIG. 3B is a left upper perspective view showing the internal configuration of charging block 200. Charging block 200 includes charging motor 201, gears 202, 203, 204, 205, and 206, intermittent gear 207, and rack member 208. Position sensor 400 is disposed at a movement destination position to which rack member 208 is moved.

Gear 203 includes large-diameter gear 203a and small-diameter gear 203b. Gear 204 includes large-diameter gear 204b and small-diameter gear 204c. Gear 205 includes large-diameter gear 205c and small-diameter gear 205d. Gear 206 includes large-diameter gear 206d and small-diameter gear 206e. Intermittent gear 207 includes whole circumferential gear portion 207e and intermittent gear portion 207f. Rack member 208 has motor-side gear portion 208f, position sensor shielding portion 208g, and shutter-side gear portion 208h. Meshing of respective gears is described. Gear 202 of charging motor 201 meshes with large-diameter gear 203a of gear 203. Small-diameter gear 203b of gear 203 meshes with large-diameter gear 204b of gear 204. Small-diameter gear 204c of gear 204 meshes with large-diameter gear 205c of gear 205. Small-diameter gear 205d of gear 205 meshes with large-diameter gear 206d of gear 206. Small-diameter gear 206e of gear 206 meshes with whole circumferential gear portion 207e of intermittent gear 207. Intermittent gear portion 207f of intermittent gear 207 meshes with motor-side gear portion 208f of rack member 208. When position sensor shielding portion 208g of rack member 208 is moved to a predetermined position, position sensor shielding portion 208g is detected by position sensor 400.

Figure 4:
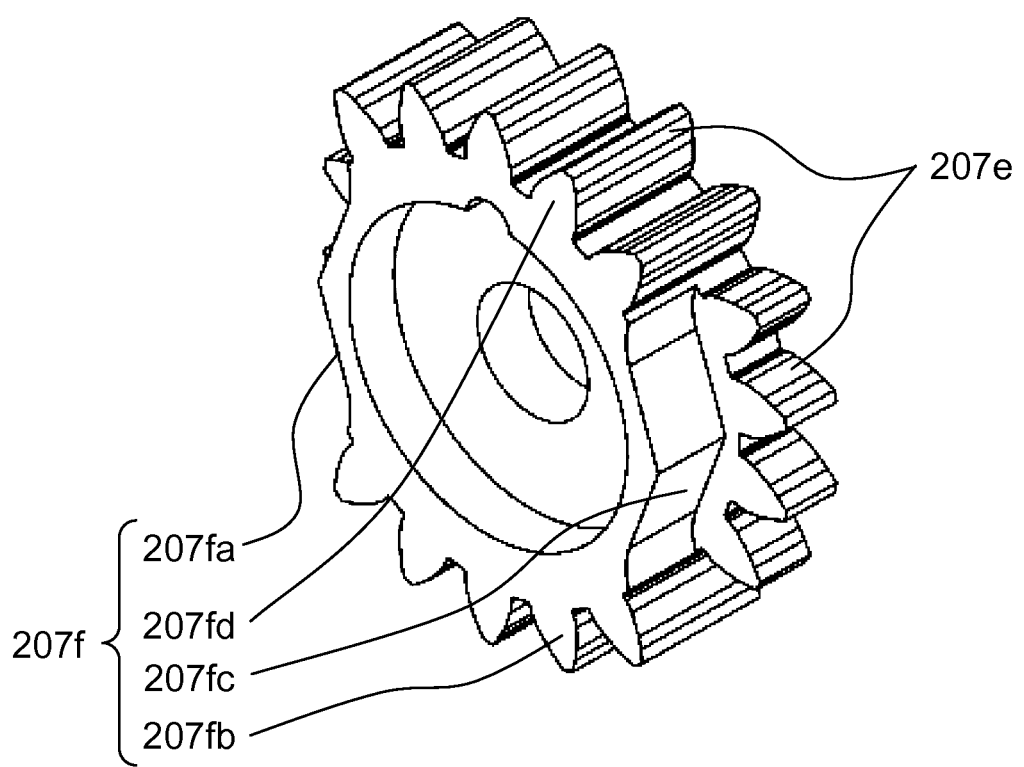
FIG. 4 is a perspective view of an intermittent gear according to the first embodiment.

The configuration of intermittent gear 207 is now described. FIG. 4 is a perspective view of intermittent gear 207. Intermittent gear 207 has whole circumferential gear portion 207e which meshes with small-diameter gear 206e, and intermittent gear portion 207f which meshes with motor-side gear portion 208f of rack member 208. Whole circumferential gear portion 207e and intermittent gear portion 207f are formed such that intermittent gear 207 is split in two in the axial direction. Rack member 208 is positioned on a mechanical shutter 100 side with respect to intermittent gear 207, and intermittent gear portion 207f is formed on a mechanical shutter side. Whole circumferential gear portion 207e has gear teeth over the whole circumference thereof. Intermittent gear portion 207f has gear portions 207fb and 207fd where gear teeth are formed, and intermittent portions 207fa and 207fc where gear teeth are not formed. As shown in FIG. 4, intermittent portions 207fa and 207fc are formed on two portions of intermittent gear 207 at positions disposed opposite to each other in the circumferential direction, and gear portions 207fb and 207fd are formed on two portions of intermittent gear 207 at positions disposed opposite to each other in the circumferential direction. Intermittent portions 207fa and 207fc and gear portions 207fb and 207fd are formed alternately in the rotational direction of intermittent gear 207. Accordingly, when intermittent gear 207 is rotated by a half turn, charging of mechanical shutter 100 can be performed one time. Due to such a configuration, a gear ratio with respect to the rotation of the charging motor 201 can be increased. The relationship between intermittent gear 207, rack member 208 and position sensor 400 is described later.

As shown in FIG. 5, rack member 208 drives mechanical shutter 100. FIG. 5 is a back view showing the internal configuration of the shutter drive device. Shutter-side gear portion 208h of rack member 208 meshes with mechanical shutter gear 101. When mechanical shutter gear 101 is rotated in the clockwise direction in FIG. 5 which is a back view, the rear curtain which is biased by the rear curtain spring is moved to an open position, and the front curtain which is biased by the front curtain spring is moved to a closed position. That is, when mechanical shutter gear 101 is rotated in the clockwise direction, a biasing force of the rear curtain biasing spring and a biasing force of the front curtain biasing spring are increased so that mechanical shutter 100 is charged. Rack member 208 is connected to mechanical shutter gear 101 at shutter-side gear portion 208h and can perform charging of mechanical shutter 100 by driving mechanical shutter 100.

When mechanical shutter gear 101 is rotated in the clockwise direction, a biasing force in the counterclockwise direction is generated due to a biasing spring.

Temperature sensor 300 shown in FIG. 2 detects a temperature of charging block 200, and outputs a detection signal to CPU 503. Temperature sensor 300 is disposed in the vicinity of rack member 208. A friction state between rack member 208 and other gears changes depending on a temperature so that a drive load changes. Temperature sensor 300 is provided for grasping such a change in friction state and a drive load.

When position sensor 400 detects rack member 208 of charging block 200, position sensor 400 outputs a detection signal indicative of the detection of rack member 208 to CPU 503. Position sensor 400 may be a photo interrupter, for example, and is disposed at a position where the position sensor 400 can detect that position sensor shielding portion 208g of rack member 208 is moved to a predetermined position. Position sensor 400 is connected to flexible cable 800.

CPU 503 is configured to control charging block 200 (charging motor 201) in accordance with an output from temperature sensor 300 and an output from position sensor 400.

1-3. Operation of Shutter Drive Device

Figure 6A:
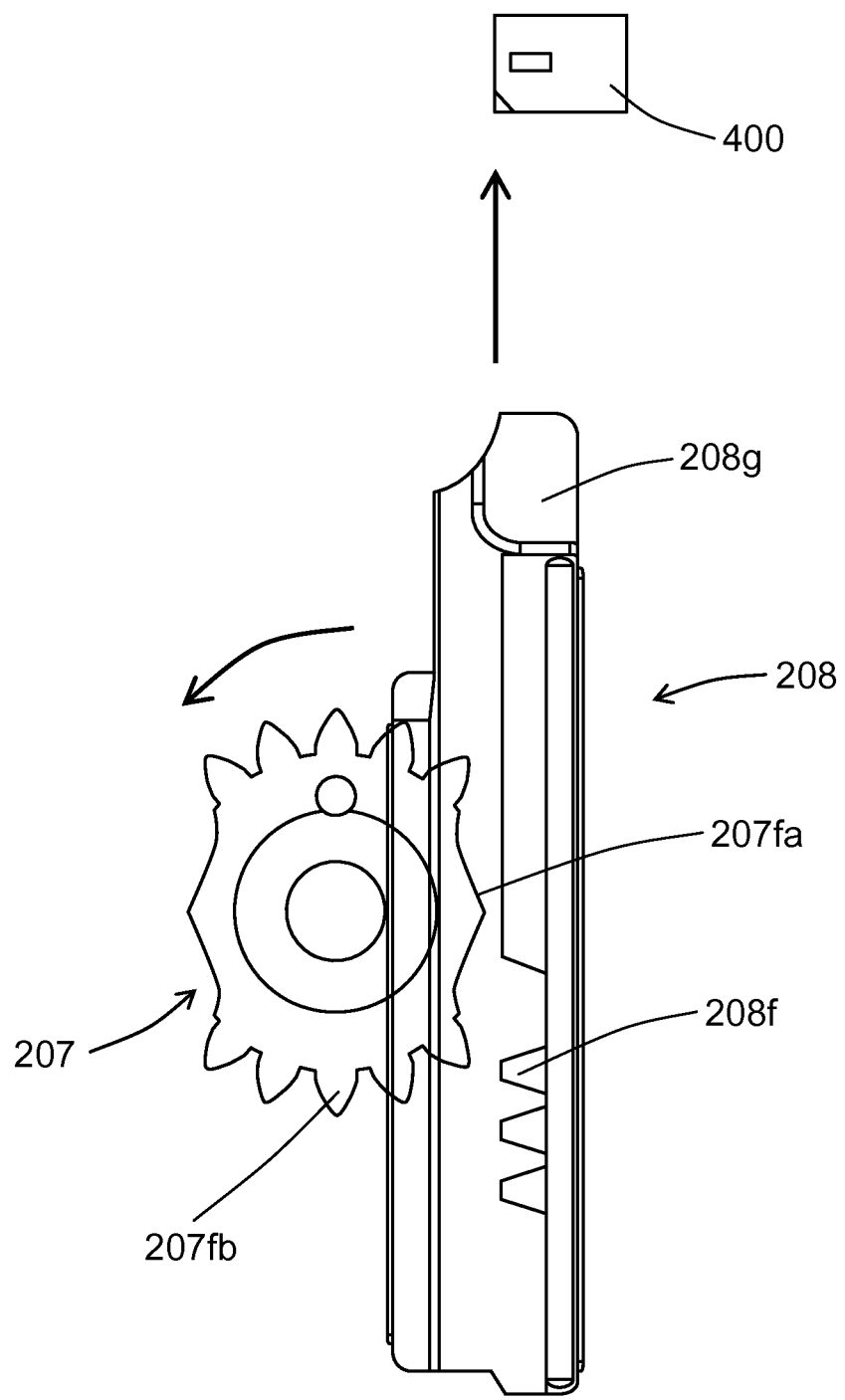
FIG. 6A is a view showing a relationship between the intermittent gear, a rack member, and a position sensor according to the first embodiment (a state before charging is performed)
Figure 6B:
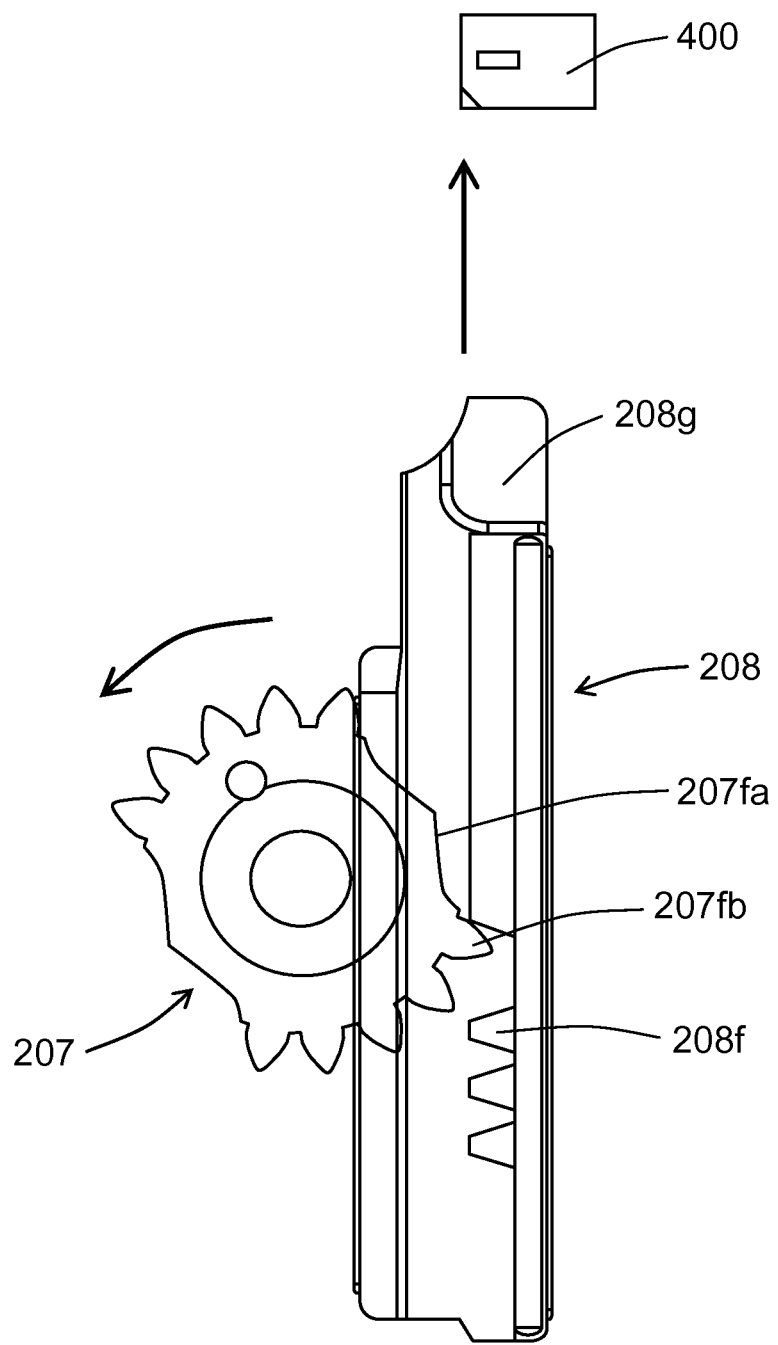
FIG. 6B is a view showing the relationship between the intermittent gear, the rack member, and the position sensor according to the first embodiment (a state where charging is started)
Figure 6C:
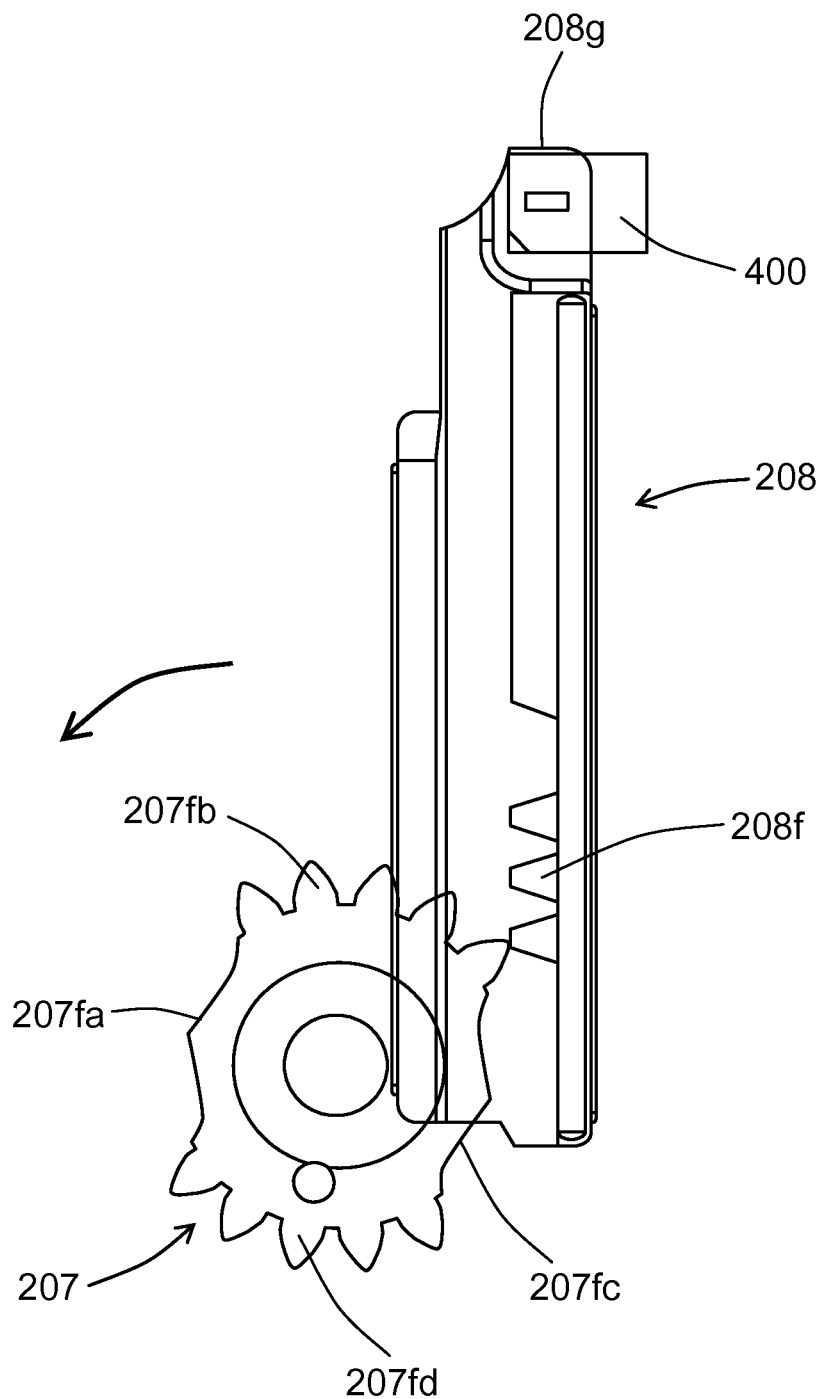
FIG. 6C is a view showing the relationship between the intermittent gear, the rack member, and the position sensor according to the first embodiment (a state just before charging is completed)

The operation of charging block 200 having the above-mentioned configuration is described. FIG. 6A to FIG. 6C are views each showing a relationship between intermittent gear 207, rack member 208, and position sensor 400. FIG. 6A shows intermittent gear 207, rack member 208 and position sensor 400 in a precharge state. FIG. 6B shows intermittent gear 207, rack member 208 and position sensor 400 in a charge start state, and FIG. 6C shows intermittent gear 207, rack member 208 and position sensor 400 in a state immediately before the completion of charging. This operation of charging block 200 is performed when camera body 700 performs continuous shooting without interposing auto focusing (AF) control in the continuous shooting, for example. The operation of charging block 200 may be performed also when camera body 700 performs continuous shooting with an AF control interposed therein. In this case, however, a frame speed at the time of performing continuous shooting becomes slow.

Mechanical shutter 100 and charging block 200 perform the following operation when continuous shooting is performed without an AF control.

(1) When intermittent gear 207 is rotated and gear portion 207fb meshes with rack member 208 (FIG. 6B) from a state where the rear curtain of mechanical shutter 100 is disposed at a closed position and the front curtain of mechanical shutter 100 is disposed at an open position, that is, from a state where intermittent gear 207 and rack member 208 do not mesh with each other (FIG. 6A), rack member 208 moves toward a position sensor 400 side.

(2) Due to the movement of rack member 208, mechanical shutter gear 101 shown in FIG. 5 is rotated so that the rear curtain is moved to the open position and the front curtain is moved to the closed position. In such an operation, position sensor shielding portion 208g of rack member 208 is moved to a position where position sensor shielding portion 208g shields position sensor 400 as shown in FIG. 6C. The rear curtain and the front curtain are attracted by electromagnets so that the front and rear curtains are held at such positions respectively. CPU 503 controls the electromagnets.

(3) When charging motor 201 is stopped, intermittent gear 207 is rotated, and intermittent portion 207fa (207fc) of intermittent gear portion 207f is rotated to a position where intermittent portion 207fa (207fc) faces rack member 208 so that the meshing of intermittent gear 207 and rack member 208 is released. Then, rack member 208 is moved to a state shown in FIG. 6A by a rotation biasing spring of mechanical shutter gear 101.

(4) CPU 503 cuts a magnetic force of the electromagnet for the front curtain and then cuts a magnetic force of the electromagnet for the rear curtain after a lapse of an arbitrary time. When the magnetic force of the electromagnet for the front curtain is cut, the front curtain is moved to the open position by the front curtain biasing spring. Further, when the magnetic force of the electromagnet for the rear curtain is cut, the rear curtain is moved to the closed position by the rear curtain biasing spring. Due to such an operation, shutter processing is performed.

(5) Thereafter, operations (1) to (4) are repeated again until the continuous shooting are stopped.

Timing at which charging motor 201 is stopped in the above-mentioned operation (3) is described with reference to FIG. 7. FIG. 7 is a timing chart of controlling position sensor 400 and charging motor 201. Position sensor 400 outputs to CPU 503 a change in level of a signal from a low level (LOW) to a high level (HIGH) in response to shielding of position sensor 400 by position sensor shielding portion 208g of rack member 208. CPU 503 receives a signal indicative of a temperature from temperature sensor 300 and controls stop timing of charging motor 201 based on the detected temperature. When an output value of temperature sensor 300 is 25° C., for example, CPU 503 turns off (OFF) a signal for controlling charging motor 201 after a lapse of time t1 (millisecond) from a change in signal from position sensor 400, and stops the rotation of charging motor 201. On the other hand, when an output value of temperature sensor 300 is 0° C., for example, CPU 503 turns off (OFF) a signal for controlling charging motor 201 after a lapse of time t2 (millisecond) from a change in signal from position sensor 400. In this manner, CPU 503 controls a rotation stop position of intermittent gear 207 by controlling the stop timing of charging motor 201 in response to an output value of temperature sensor 300.

As shown in FIG. 7, time t2 is shorter than time t1. That is, the lower a temperature, the earlier the stop timing of charging motor 201 becomes. In this embodiment, when an output of temperature sensor 300 indicates a predetermined temperature or above, CPU 503 turns off a signal for controlling charging motor 201 after a lapse of time t1 (millisecond) from a change in signal detected by position sensor 400. On the other hand, when the output of temperature sensor 300 indicates a temperature below the predetermined temperature, CPU 503 turns off a signal for controlling charging motor 201 after a lapse of time t2 (millisecond) from a change in signal detected by position sensor 400. In this embodiment, the control is performed in two stages, that is, at time t1 and at time t2 with reference to the predetermined temperature. However, the control may be performed in three or more stages by setting two or more threshold values.

1-3. Advantageous Effects and the Like

As has been described heretofore, in this embodiment, the rotation stop position of intermittent gear 207 can be properly controlled by controlling stop timing of charging motor 201 based on an output value of temperature sensor 300. As a result, it is possible to provide the shutter drive device which can properly drive charging motor 201 from a low temperature to a high temperature and, at the same time, it is possible to increase a frame speed at the time of performing high-speed continuous shooting. Particularly, at the time of performing high-speed continuous shooting, the respective gears are continuously rotated at a high speed and hence, there exists a tendency that a temperature of an area around the gears is elevated and a time interval between frames is shortened whereby it is necessary to control a rotation stop position of intermittent gear 207 more accurately. Accordingly, it is significant that a rotation stop position of intermittent gear 207 is controlled based on a temperature of the area in the vicinity of the gears.

Other Embodiments

The first embodiment has been described as an example of the technique disclosed in this application heretofore. However, the techniques according to the present disclosure are not limited to the above-mentioned embodiment, and are also applicable to embodiments which are obtained by suitably applying changes, replacements, additions, omissions or the like to the embodiment described heretofore.

Other embodiments are described hereinafter.

In the first embodiment, two intermittent portions 207fa and 207fc are formed on the intermittent gear 207 so that charging of mechanical shutter 100 can be performed two times and shutter processing is also performed two times by one rotation of intermittent gear 207. However, the present disclosure is not limited to such an embodiment. Three or more intermittent portions may be formed on intermittent gear 207 so that shutter processing may be performed three or more times per one rotation of the intermittent gear 207. When the number of times of shutter processing per one rotation of intermittent gear 207 is increased, the necessity of controlling stop timing of intermittent gear 207 accurately is increased and hence, a control of stop timing of intermittent gear 207 based on a temperature becomes necessary.

In the first embodiment, the stop timing of charging motor 201 is advanced with decrease in the temperature detected by temperature sensor 300. However, the present disclosure is not limited to such an embodiment. Depending on the configurations of gears 202, 203, 204, 205, and 206, intermittent gear 207, rack member 208 and mechanical shutter gear 101, there may be a case where the lower a temperature detected by temperature sensor 300, the more stop timing of charging motor 201 is delayed.

In the first embodiment, the description is made with respect to continuous shooting which is not accompanied with auto focusing control. The present disclosure is not limited to such an embodiment, and stop timing of charging motor 201 may be controlled based on an output of temperature sensor 300 during continuous shooting accompanied with auto focusing control. However, during continuous shooting accompanied with auto focusing control, rack member 208 is temporarily stopped between a state shown in FIG. 6B and a state shown in FIG. 6C. As a result, rack member 208 stops at a position in the vicinity of position sensor 400. Accordingly, even when rack member 208 is moved again, a speed of rack member 208 does not become so fast until rack member 208 moves to a position where rack member 208 is detected by position sensor 400 and hence, the deviation of stop timing does not largely influence the lowering of a frame speed.

In the first embodiment, stop timing of charging motor 201 is controlled with reference to timing at which position sensor 400 detects a position of rack member 208 using position sensor 400. However, the present disclosure is not limited to such a control. Stop timing of charging motor 201 may be controlled by detecting a rotation position of mechanical shutter gear 101 which meshes with rack member 208 with reference to a detection result without using position sensor 400.

As described above, the embodiments are described for exemplifying the techniques of the present disclosure. Accordingly, the accompanying drawings and the detailed descriptions are provided for exemplifying the techniques of the present disclosure.

Accordingly, the components described in the accompanying drawings and the detailed descriptions may also include components which are unnecessary for overcoming the problems, in order to exemplify the aforementioned techniques, as well as components necessary for overcoming the problems. Therefore, such unnecessary components should not be immediately determined to be necessary, for the reason that these unnecessary components are described in the accompanying drawings and the detailed descriptions.

Further, the aforementioned embodiments are merely for exemplifying the techniques according to the present disclosure and, therefore, various changes, replacements, additions, omissions and the like can be made thereto within the scope of the claims and scopes equivalent thereto.

The present disclosure is applicable to a digital still camera, a movie, a portable telephone with camera function, a smart phone and the like.

What is claimed is:

1. A shutter drive device comprising:
   a shutter mechanism;
   a charging member that drives the shutter mechanism by using a plurality of gears, a rack member, and a motor;
   a temperature sensor mounted on the charging member;
   a sensor that detects the rack member moved to a predetermined position; and
   a control part that controls stop timing of the motor based on a position of the rack member detected by the sensor during such time that the motor moves the rack member to the predetermined position and a temperature detected by the temperature sensor, wherein
   the control part advances the stop timing of the motor when the temperature detected by the temperature sensor is lower than a predetermined temperature.

2. The shutter drive device according to claim 1, wherein
   the plurality of gears include an intermittent gear, and
   the intermittent gear is configured to perform shutter processing plural times per one rotation.

3. The shutter drive device according to claim 1, wherein
   the control part advances the stop timing of the motor with decrease in the temperature detected by the temperature sensor.

4. The shutter drive device according to claim 1, wherein
   the control part controls the stop timing of the motor based on the temperature detected by the temperature sensor during continuous shooting not accompanied with auto focusing control.

5. A shutter drive device comprising:
   a shutter mechanism;
   a charging member that drives the shutter mechanism by a plurality of gears, a rack member, and a motor;
   a temperature sensor mounted on the charging member; and
   a control part that controls stop timing of the motor based on a temperature detected by the temperature sensor during such time that the motor is moving the rack member, wherein
   the control part advances the stop timing of the motor when the temperature detected by the temperature sensor is lower than a predetermined temperature.

\* \* \* \* \*